(12) United States Patent
Oh

(10) Patent No.: US 6,397,766 B1
(45) Date of Patent: Jun. 4, 2002

(54) EVAPORATIVE AND REGENERATIVE WASTE WATER INCINERATION SYSTEM

(75) Inventor: Suk-in Oh, Kwangju (KR)

(73) Assignee: Key Engineering Co., Ltd. (KR)

( * ) Notice: Subject to any disclaimer, the term of this patent is extended or adjusted under 35 U.S.C. 154(b) by 0 days.

(21) Appl. No.: 09/763,377

(22) PCT Filed: Aug. 21, 1999

(86) PCT No.: PCT/KR99/00475

§ 371 (c)(1),
(2), (4) Date: Feb. 21, 2001

(87) PCT Pub. No.: WO00/11405

PCT Pub. Date: Mar. 2, 2000

(30) Foreign Application Priority Data

Aug. 21, 1998 (KR) .............................. 98/33850

(51) Int. Cl.⁷ .............................. F23G 7/04; F23L 15/02; F23C 5/28
(52) U.S. Cl. .................. 110/342; 110/238; 110/348; 110/233; 110/345; 432/180; 431/175; 431/215; 431/5; 431/7
(58) Field of Search ................. 431/175, 5, 7, 431/215; 432/179, 180, 181; 165/4, 5, 7; 110/210, 238, 342, 345, 346, 348, 233

(56) References Cited

U.S. PATENT DOCUMENTS

| | | | |
|---|---|---|---|
| 4,176,162 A | * 11/1979 | Stern | 423/210 |
| 4,470,806 A | * 9/1984 | Greco | 432/182 |
| 4,976,611 A | * 12/1990 | Knop et al. | 432/181 |
| 5,026,277 A | * 6/1991 | York | 432/181 |
| 5,101,741 A | * 4/1992 | Gross et al. | 110/233 |
| 5,240,403 A | * 8/1993 | McAnespie | 431/5 |
| 5,620,668 A | * 4/1997 | Driscoll et al. | 422/175 |
| 5,837,205 A | * 11/1998 | Bayer et al. | 422/109 |
| 6,042,795 A | * 3/2000 | Chen et al. | 432/210 |

OTHER PUBLICATIONS

Pennington, Shedding Light on New Generation RTO Technology, Jun. 1999, 1–4.*

* cited by examiner

Primary Examiner—Denise L. Esquivel
Assistant Examiner—K. B. Rinehart
(74) Attorney, Agent, or Firm—Cantor Colburn LLP

(57) ABSTRACT

There are provided an evaporative/regenerative incineration system for organic waste water for incinerating organic waste water and volatile organic compounds completely at low expenses and a method therefor. Waste gas is generated by evaporating waste water including organic compounds in an evaporator and the generated waste gas is mixed with air in a regenerative thermal oxidizer (RTO) in flow communication with the evaporator for oxidation. The heat energy generated from the oxidation is collected and supplied to the evaporator.

14 Claims, 3 Drawing Sheets

EVAPORATIVE AND REGENERATIVE WASTE WATER INCINERATION SYSTEM

BACKGROUND OF THE INVENTION

1. Field of the Invention

The present invention relates to a system for incinerating organic waste water and volatile organic compounds and a method therefor and more particularly, an evaporative and regenerative waste water incineration system for economically and efficiently removing the organic compounds by oxidizing the waste gas generated from evaporated waste water including the organic compounds using a regenerative thermal oxidizer.

2. Description of the Related Art

Generally, volatile organic compounds including a total of hydrocarbon compounds are materials generally created in chemical factories, waste water treatment plants and during the printing works in car manufacturing factories, and cause the photochemical smog, warming of the Earth, destruction of ozone layer in the stratosphere, and so on, and very fatally toxic to human body such as developing cancer, etc. and the human environment.

The known techniques to treat the volatile organic compounds are incineration, absorption for removal, adsorption, cooling condensation, biological treatment and layer separation methods, etc. And especially regenerative thermal oxidation method is widely used.

A Regenerative thermal Oxidizer (now referred to as RTO) is operated by incinerating the waste gas including the volatile organic compounds, and collecting the heat generated during the incineration through a ceramic filler material thereby greatly reducing the operation expenses of the system, and minimizing an installation space. The treatment efficiency of the RTO is very high over 99%, and a second contamination is little, and if the concentration of the volatile organic compounds in the waste gas is over 300 vppm, a supplementary supply of energy is not necessary by using the incineration energy from the system, itself.

Describing its operation more detail, the RTO maximmably collects the waste heat energy discharged from the waste gas and turns the energy to preheat introduced gas. For this purpose, it employs ceramic which is directly heated and cooled for its regeneration instead of a typical heat exchanger.

That is, when using a shell & tube type heat exchanger or a plate type heat exchanger for the heat exchange of gas, the temperature difference of the gas between the inlet and the outlet of the heat exchanger is 100 to 200° C. thereby limiting the usage. However, the ceramic has its maximum service temperature by 950° C., and when regenerating, the temperature difference between the inlet and the outlet can be reduced to 20° C. thereby achieving 98% of the heat recovery rate.

FIGS. 1 and 2 show the operation states of forward/rearward direction in the typical RTO. After heating a furnace placed between ceramic layers 1, 2 disposed on the left and right sides of the RTO to be appropriate for the operation of the furnace at the start of the operation, the waste gas is introduced.

The waste gas is preheated up to the temperature of the furnace passing the ceramic layer 1, and the organic gas in the waste gas starts its oxidation and while passing through the furnace for a certain time period, all the organic compounds are oxidized at a temperature of about 800° C.

At this time, while the treated gas at a high temperature passes though the ceramic layer 2, the gas discharges out almost all heat so that the gas is cooled just down to a temperature of 10 to 30° C. higher than the temperature of the inlet in the ceramic layer 1.

At this time, after a while, the inlet path for the gas is switched as shown in FIG. 2.

The switching operation shown in FIGS. 1 and 2 is repeated with a certain interval of time (about 1.5 to 3 minutes) thereby minimizing the energy for the gas incineration.

The system shown in FIGS. 1 and 2 is called a 2-bed type RTO, and the 2-bed type RTO is an economical system. However, not-treated gas existing on the ceramics of the RTO during the switching of the valves and other not-treated gas passing through the furnace of the RTO in a roundabout way are discharged at a time during the switching of the valves so that the removal efficiency of the whole organic compounds is around 95% due to the discharge of the not-treated gas.

To address this problem, a 3-bed type RTO or a gas buffer can be used. The case of using the buffer is shown in FIG. 3.

That is, the incineration system comprises an RTO, a gas buffer and a blower.

The operation of forward direction by using the buffer 12 is described as follows:

The not-treated waste gas from the processes is introduced into a ceramic layer 3 on one side of the 2-bed type RTO with a valve 5 open. The introduced gas at room temperature is heated up to 800° C. for oxidation by the regenerative ceramic so that the organic volatile compounds (VOC) in the air is oxidized. The temperature of the gas after oxidation is about 830° C. which is 30° C. higher than that of the regeneration ceramic. The gas at this temperature is cooled down passing through a ceramic layer 4 at the other side. Most of the heat is transmitted to the ceramic layer 4 thereby increasing the temperature of the ceramic 4. The cooled-down gas passes through a valve 8, the blower 13, and a valve 10 in turn and is discharged to the atmosphere.

As described above, during the operation of the forward direction, the valve 5, 8 are open and the valves 6, 7 are closed. A buffer valve 9 at the front of the gas buffer is closed.

While the operation of the forward direction is maintained for about 2 minutes, the ceramic of the ceramic layer 3 preheats the gas and is cooled down. The ceramic layer 4 absorbs the heat of the heated gas and is heated. At this time, the introduction of the gas is started with the operation start of the rearward direction.

The operation conditions in the forward direction and the rearward direction are the same, and the introduction direction of the waste gas is changed to the ceramic layer 4 on the other side. There exists a switching time between the operation of the forward/rearward direction.

Since the valves 5,8 of the rearward direction are closed and the valves 6,7 are open, not-treated waste gas present between the ceramic layer 3 and the valve 5 passes through the valve 7 by the blower 13, and is discharged through the valve 10 to the atmosphere.

To prevent this, by using the gas buffer 12, the buffer valve 9 is open, and the valve 10 of a pipe leading to a smokestack is closed.

Therefore, the not-treated gas is collected into the gas buffer 12 through the buffer valve 9, and the treated gas on the upper side of the gas buffer 12 is directly discharged out of the smokestack.

After the switching time, the gas path at the back side of the RTO is turned to the discharge pipe, and the buffer valve 9 is closed.

There is provided a diaphragm inside the gas buffer 12 to minimize the mixing of the introduced gas. The lower side of the buffer is connected to the inlet line for not-treated gas, and the upper side of the buffer is in flow communication with the discharge pipe to the atmosphere. The not-treated gas stored in the buffer is automatically circulated to the front of the RTO with the valve 11 open, and the inside of the buffer is changed with a gas introduced from the atmosphere until the next switching time.

Meanwhile, in chemical factories, the waste water treatment and cars manufacturing companies, large amount of other kinds of waste water beside the above organic compounds is generated. When the concentration of the organic compounds in the organic waste wate is low (e.g., COD lower than 5,000 ppm), it is treated with active oil treatment, but in case of high concentration (e.g., COD higher than 10,000 ppm), the active oil treatment is not sufficient and not economical so that it is treated by incinerating.

At this time, the waste water incineration using a typical incineration furnace is operated by introducing the waste water including organic compounds (VOC included) into the incineration furnace, and oxidizing the organic compounds in the waste water by heating the waste water up to 950° C. However, even though the heat exchanger can be used to collect the energy, the recovery rate of the heat is very low and the operation expenses of the incineration furnace is large.

Therefore, the installation of such a typical incineration furnace results in an increased production expenses due to its highly increased expenses for the antipollution measures thereby requiring the development of an economical treatment system for waste water at low-energy consumption.

Typically, in the incineration system, the organic waste water is directly sprayed into a high temperature of the furnace so as to evaporate the waste water in the furnace, and oxidize the gaseous organic compounds. In case that the waste water includes salt, a quenching type incineration furnace as shown in FIG. 4 is employed, and in case of the waste water without salt, the heat exchangeable incineration furnace as shown in FIG. 5 is employed.

However, in the typical incineration method as described above, the waste water is all directly sprayed into the furnace so that heat energy is oversupplied thereinto, and because of the use of just recovery heat exchanger, the heat recovery rate is very low with absence of medium for heat exchange.

SUMMARY OF THE INVENTION

The present invention provides an incineration system for treating organic waste water and volatile organic compounds while providing the same efficiency with that of the incineration systems of related arts or better and saving the operation expenses for the system by at least 80%.

The main ideas and objects of the present invention can be summarized as follows in three points.

First, a regenerative thermal oxidizer (now herein after referred to as RTO) for use in treating waste gas including organic compounds is employed for treating waste water and an evaporator is employed for generating waste gas for the above purpose.

Second, heat energy created from the oxidation of the organic compounds in the waste gas can be fed back to be used as a source to operate the evaporator while maximizing the characteristics of the RTO consuming a little energy for the oxidation.

Third, the remnant not-treated gas present from the former stage generated during the switching of the operation of forward/rearward direction is accumulated at a certain space before being treated with batch-processing at a later stage.

According to one aspect of the present invention, there is provided an incineration method for incinerating waste gas in the RTO after evaporating the organic waste water including organic compounds by heating up to a certain temperature using an evaporator.

According to another aspect of the present invention, there is provided an evaporative and regenerative incineration system for organic waste water in which waste gas is generated by evaporating organic waste water including organic compounds, the generated waste gas is oxidized with air, and the heat energy from the oxidization is regenerated to evaporate the waste water.

It is to be understood that both the foregoing general description and following detailed description are exemplary and explanatory and are intended to provide further explanation of the invention as claimed.

DETAILED DESCRIPTION OF THE INVENTION

Reference will now be made in detail to the preferred embodiment of the present invention, examples of which are illustrated in the accompanying drawings.

Figure 1:
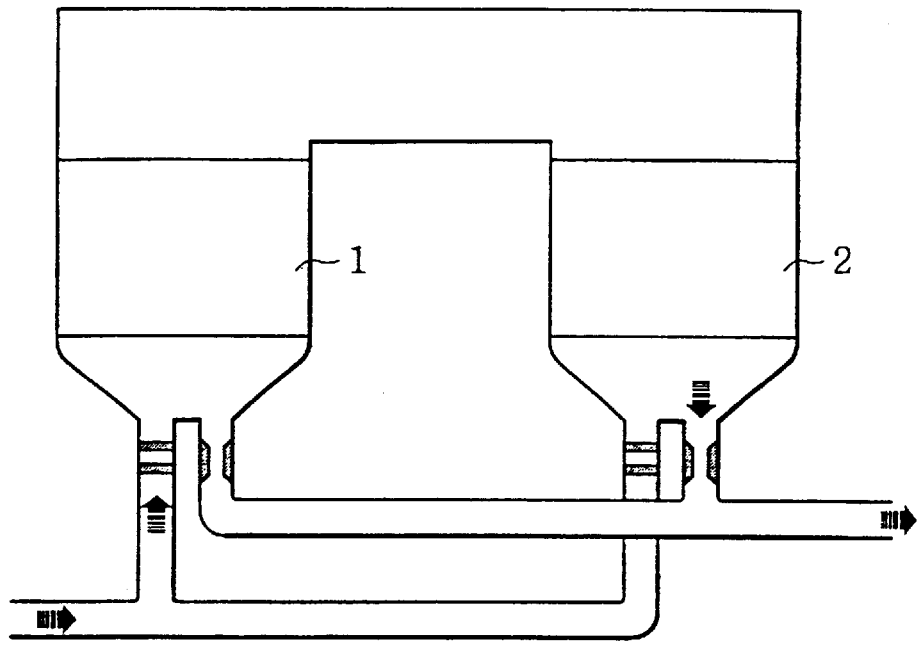
FIG. 1 shows the operation state in a 2-bed RTO in the forward direction.
Figure 2:
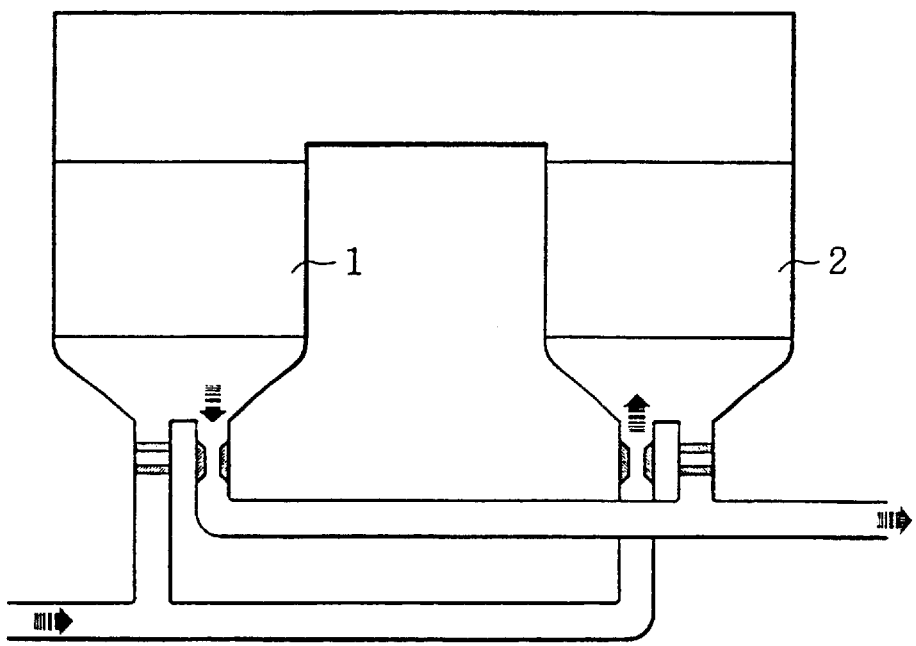
FIG. 2 shows the operation state in the rearward direction in the FIG. 1.
Figure 3:
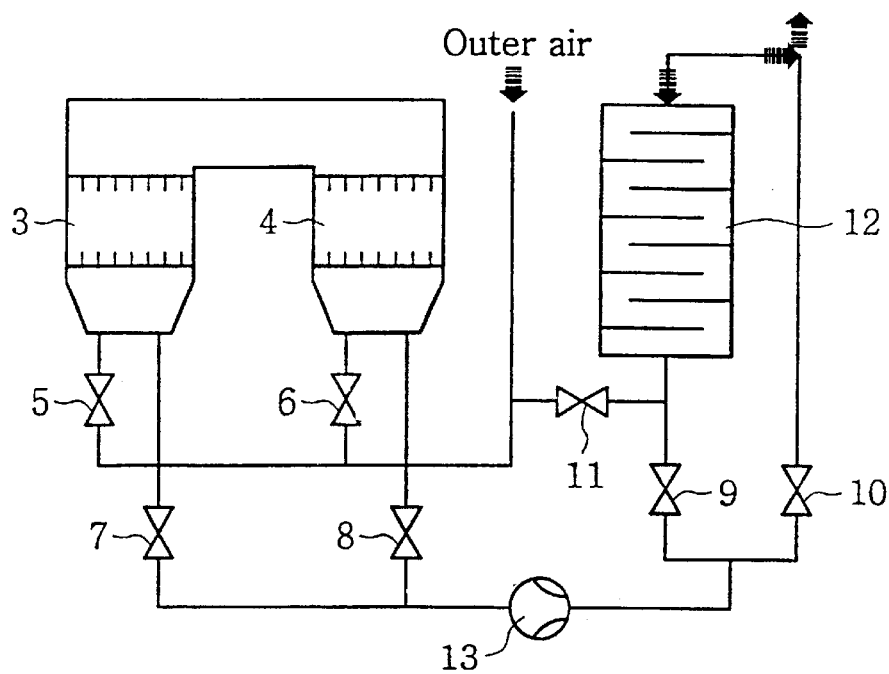
FIG. 3 is a configuration showing a typical 2-bed type RTO using a gas buffer.
Figure 4:
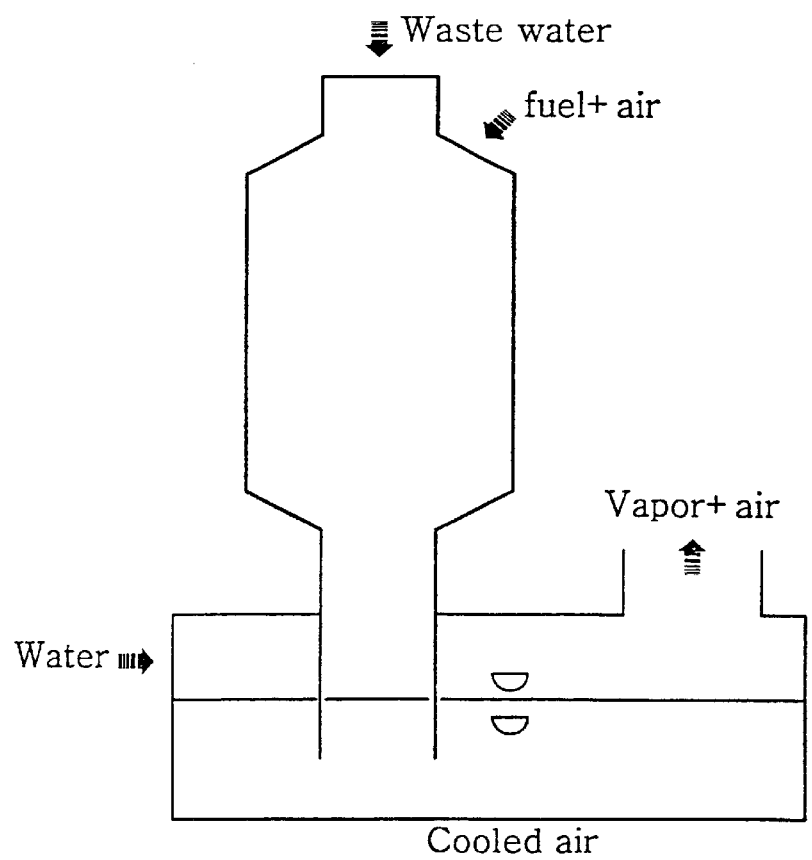
FIG. 4 shows a typical incinerator for waste water including salt.
Figure 5:
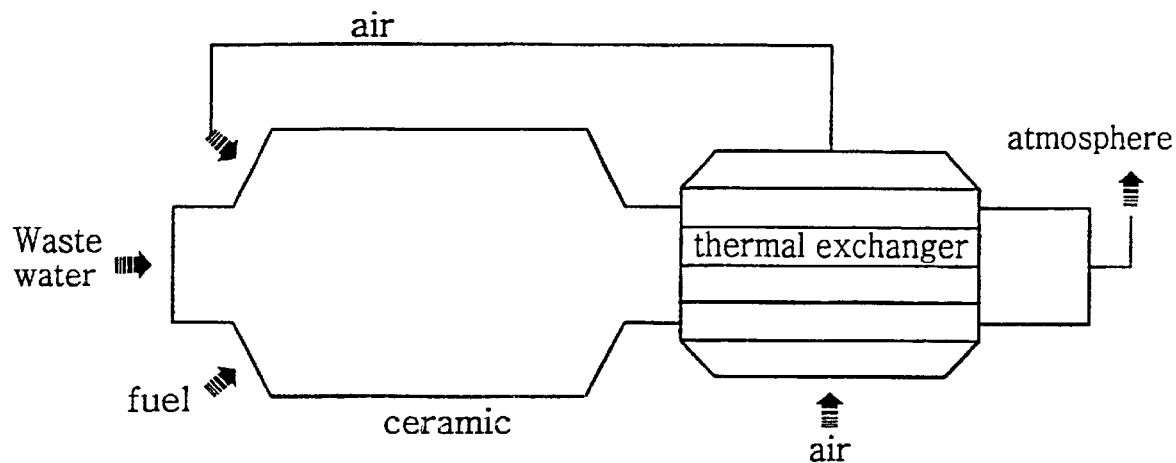
FIG. 5 shows a typical incinerator for waste water without salt.
Figure 6:
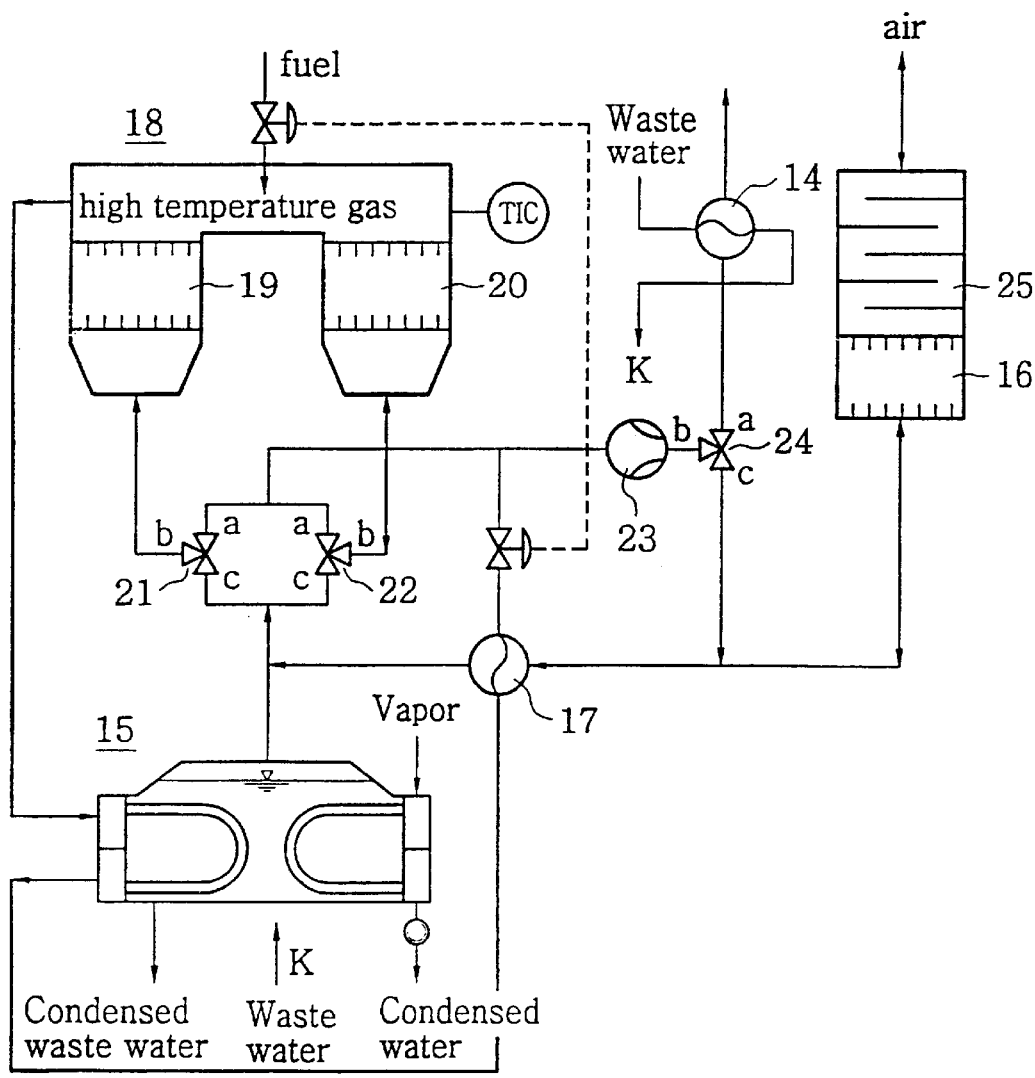
FIG. 6 shows an incineration system for organic waste water according to the present invention.

FIG. 6 is a configuration showing an evaporative and regenerative waste water incineration system according to the present invention.

As illustrated in the drawing, there are a typical 2-bed type regenerative thermal incineration system and a specially-designed buffer and an evaporator coupled each other. In other words, there is an evaporator 15 at the front of a regenerative thermal oxidizer(RTO) 18 in a typical regenerative thermal incineration system so as to heat and evaporate waste water before being introduced into the incineration system.

An evaporative and regenerative waste water incineration system for waste water according to the present invention will be described in detail referring to FIG. 6.

First, not-treated waste water is heated through a thermal exchanger 14 and introduced into the evaporator 15. Waste gas is evaporated from the waste water introduced into the evaporator 15, and the evaporated waste gas is mixed with not-treated gas, which was stored in a buffer 25 and then, has been preheated passing through a buffer condenser 16 and a thermal exchanger 17, which will be explained in the following, and the mixed gas is introduced into the 2-bed type RTO 18. The condensed waste water generated at this stage is fed back into a waste water tank.

In case that the waste gas is introduced into a left-side ceramic layer 19 in the forward operation direction, c and b of a 3-way valve 21 are opened, and its a is closed.

The mixed gas introduced into the left-side ceramic layer 19 is heated around a temperature of 850° C., and the organic compounds are oxidized with temperature increased so that the temperature of the gas inside a furnace is maintained at a temperature of 950° C.

The heated oxidized gas is cooled down passing through a right-side ceramic layer 20, and then, is absorbed into a blower 23 through a 3-way valve 22, which opens its b and a and closes its c at this stage.

The forward direction operation as above is maintained for about 2 minutes, and the rearward direction operation is, in turn, maintained for about 2 minutes by converting the gas flow path.

That is, the mixed gas is introduced into the right-side ceramic layer 20 according to the rearward operation direction and c and b of the 3-way valve 22 are open and its a is closed at this stage.

The mixed waste gas introduced into the right-side ceramic layer 20 is heated up to a temperature of 850° C. by a ceramic which is preheated with accumulated heat energy at the former stage, and the organic compounds are oxidized with temperature increased so that the temperature of the gas inside a furnace is maintained at a temperature of 950° C.

The heated oxidized gas is cooled down passing through the left-side ceramic layer 19, and then, is absorbed into the blower 23 through the 3-way valve 21 so as to be discharged into the air. At this stage, b and a of the 3-way valve 21 are open and its c is closed.

During the operation switching of the above forward and rearward direction, there becomes present not-treated gas at the front position of the ceramic layer 19, 20 to introduce the above mixed waste gas. The remnant not-treated waste gas is stored in the buffer during the operation switching of the forward and rearward direction, which will be described in detail.

First, assuming that the forward direction of operation is finished, b and c of the 3-way valve 22 are open and its a is closed, and the b and a of the 3-way valve 21 are open and its c is closed for the start of the operation of the rearward direction.

At this stage, the blower 23 absorbs the above remnant not-treated gas, and when b and c of a 3-way valve 24 are open and its a is closed, the above gas is stored in the buffer 25 through the buffer condenser 16 made of ceramic. The not-treated gas at a high temperature is cooled down while passing through the buffer condenser 16 of the ceramic, and the volume of the above gas is reduced due to the cooling so as to decrease the size of the buffer 25.

The buffer 25 is in flow communication with the atmosphere, and stores not-treated gas to be introduced during the predetermined switching time owing to its volume corresponding to the switching time. While the not-treated gas is stored in the buffer 25, the air introduced into the buffer 25 at the former stage is discharged out of the buffer. While the not-treated gas is discharged out of the buffer 25, the air is introduced into the buffer from the atmosphere.

As described above, with the start of the operation of rearward direction, the waste gas discharged from the evaporator 15 is mixed with the not-treated gas, which has been stored in the buffer 25, after passing through the buffer condenser 16 and being preheated in the heat exchanger 17.

Here, the buffer condenser 16 is heated by taking out heat energy from the introduced not-treated gas, and thus, the not-treated gas is preheated passing through the buffer condenser 16.

According to the present invention, the RTO 18 consumes only small amount of heat energy for its operation. Accordingly, only some amount of heat energy from the oxidation of the organic compounds in the introduced mixed waste gas is used, and the rest of the heat energy is supplied to the evaporator 15 or other heat sources through a discharge line P for surplus energy. Therefore, throughout the whole operations in the system, the heat energy can be efficiently used.

This will be described in more detail in the following.

With the recovery rate of the calory by the exothermic reaction of the organic compounds in the waste gas as 85%, the necessary calories for the incineration of the waste gas and the evaporation of the waste water inside the RTO are calculated. If the waste water including the organic compounds is 2 MT (water 1950 kg and the waste organic compounds 50 kg), the amount of the air required for the incineration of the evaporated waste gas is determined as 1200 m$^3$ with waste gas:air=1:1.

The calories required to evaporate the waste water is 1,950 kg×540 kcal/kg=1,053,000 kcal. At this stage, the latent heat of the vapor is 540 kcal/kg. If calculating calories necessary to incinerate in the RTO, and assuming the sum of the waste gas and air=2400 m$^3$, CP=0.38, and the temperature difference T between the inlet and the outlet=50° C., the calories is 2400 m$^{3\times0.38}$ cal/m$^{3°}$ C.×50° C.=45,600 kcal. Therefore, the calories to evaporate the waste water and to incinerate the waste gas is $$1{,}053{,}000 \text{ kcal} + 45{,}600 \text{ kcal} = 1{,}098{,}600 \text{ kcal} \qquad (1)$$

If the exothermic energy of the organic compounds in the waste gas is 500,000 kcal/MT, the total energy is 500,000 kcal/MT 2 MT=1,000,000 kcal. As described above, if the recovery rate is 85%, the total calories for the evaporation and the incineration is $$1000{,}000 \text{ kcal} \times 0.85 \text{ kcal} = 850{,}000 \text{ kcal}. \qquad (2)$$

Therefore, the calory to be supplied from the outside can be calculated by subtracting (2) from (1). That is, 1,098,600 kcal−850,000 kcal=248,600 kcal/2 MT=124,300 kcal/MT.

Meanwhile, the calory required in a typical incineration system is calculated as follows:

In the typical incineration method, the waste water including the organic compounds is heated for incineration. For this purpose, it should be heated up to 950° C. to evaporate the water in the waste water and to oxidize the organic compounds. If calculating the amount of the necessary air, in case of 120% of air (compatible surplus air rate), for example, it is 12.5 m$^3$ with LNG of 1 m$^3$ (10,000 kcal).

Therefore, when the temperature of the air to be introduced into the incineration system is 30° C., the calories necessary to increase the temperature of the air (12.5 m$^3$) up to 950° C. is 12.5 m$^3$×0.35 kcal/m$^{3°}$ C.×(950° C.−30° C.)=4,000 kcal. The 4,000 kcal is a calory to increase the temperature of the air, itself up to a temperature of 950° C., and the calory to be used to evaporate is 6,000 kcal from the 10,000 kcal.

Alternatively, in case of 2 MT of the waste water including organic compound (water 1950 kg, organic compound 50 kg), the calory required for the evaporation is 1950 kg×900 kcal=1,755,000 kcal, and the total supply calory is 1,750,000 kcal×10,000 kcal(gross). 6,000 kcal(net)=2,925,000 kcal. Besides the calory by the exothermic reaction, 500,000 kcal/MT×2MT=1,000,000 kcal, the calory to be supplied from the outside is 2,925,000−1,000,000=1,925,000 kcal. If the recovery rate of the heat energy in the waste heat recovery is 50%, the real calory to be used is 1,925,000 kcal×0.5=962,500 kcal/2 MT=481,250 kcal/MT. Therefore, the required unit calory rate is higher than the case of the present invention by about 3.9 times.

That is, according to the system for incinerating the organic waste water of the present invention, the required calory can be saved by 356,950 kcal for 1 MT compared with the typical incineration system.

As described above, according to the present invention, the installation expenses for the system is lower than that of the typical one, and the operation expenses can be saved by 80%.

In addition, while the waste water is directly introduced into an incinerator in the typical system, and is heated up to 950° C., according to the present invention, since the waste water is evaporated and then, mixed with the air before being supplied into RTO, the energy only to evaporate before being introduced into RTO can be supplied from the outside, and the rest of the energy for the operation can be recovered by over 95%.

In addition, since the RTO consumes only small amount of energy due to its operational characteristics, that is, a portion of the energy from the oxidation of the organic compounds in the mixed waste gas is used, and the rest of the energy is supplied to the evaporator, the efficiency of the heat energy is high throughout the whole system.

It will be apparent to those those skilled in the art that various modifications and variations of the present invention can be made without departing from the spirit or scope of the invention. Thus, it is intended that the present invention cover the modifications and variations of this invention provided they come within the scope of the appended claims and their equivalents.

What is claim is:

1. An incineration method of treating organic waste water comprising the steps of:

heating organic waste water up to a certain temperature to generate a waste gas in an evaporator;

introducing the waste gas into a regenerative thermal oxidizer;

oxidizing the waste gas with air;

supplying a portion of heat energy generated during the oxidizing into the evaporator; and discharging the oxidized gas from the regenerative thermal oxidizer.

2. The incineration method of treating organic waste water of claim 1, further comprising preheating the organic waste water before the heating.

3. The incineration method of treating organic waste water of claim 1, further comprising mixing the waste gas with an untreated waste gas which has remained in a previous stage.

4. The incineration method of treating organic waste water of claim 1, further comprising temporarily storing an untreated waste gas remaining the regenerative thermal oxidizer in a buffer.

5. The incineration method of treating organic waste water of claim 4, further comprising cooling down the untreated gas before the storing by passing through a buffer condenser.

6. The incineration method of treating organic waste water of claim 4, further comprising heating the untreated gas stored in the buffer by passing through a buffer condenser.

7. The incineration method of treating organic waste water of the claim 1, wherein the regenerative thermal oxidizer is a 2-bed type regenerative thermal oxidizer.

8. An incineration system of treating organic waste water comprising:

an evaporator for heating organic waste water including organic compounds and generating a waste gas;

a regenerative thermal oxidizer having a pair of ceramic layers, and a furnace, displaced between the pair of ceramic layers, wherein the waste gas is introduced through one of the ceramic layer, preheated, oxidized with air in the furnace, and discharged through the other one of the ceramic layers; and a blower for discharging the discharged gas from the regenerative thermal oxidizer.

9. The incineration system of treating organic waste water of claim 8, further comprising a first valve and a second valve for defining a first path to receive the waste gas from the evaporator and a second path to receive the waste gas discharged from the regenerative thermal oxidizer according to and operation of forward/rearward direction of the regenerative thermal oxidizer at the same time.

10. The incineration system of treating organic waste water of claim 9, further comprising a buffer for temporarily storing a untreated waste gas, which has remained at a previous stage during a switching of the operation of the forward/rearward direction of the regenerative thermal oxidizer, until a next stage.

11. The incineration system of treating organic waste water of claim 10, further comprising a 3-way valve for switching a third path to discharge treated waste gas from the regenerative thermal oxidizer and a fourth path to send the untreated gas into the buffer.

12. The incineration system of treating organic waste water of claim 10, wherein a buffer condenser is installed before the buffer to perform heat exchange with the untreated waste gas.

13. The incineration system of treating organic waste water of a claim 8, further comprising a means for supplying the heat energy generated from the waste gas oxidized in the furnace of the regenerative thermal oxidizer into the evaporator.

14. The incineration system of treating organic waste water of claim 12, wherein the buffer condenser includes a ceramic.

* * * * *

UNITED STATES PATENT AND TRADEMARK OFFICE
CERTIFICATE OF CORRECTION

PATENT NO.   : 6,397,766 B1
DATED        : June 4, 2002
INVENTOR(S)  : Suk-in Oh It is certified that error appears in the above-identified patent and that said Letters Patent is hereby corrected as shown below:

Column 1,
Line 28, after "Regenerative" delete "thermal" and insert -- Thermal --;
Line 39, after "operation" insert -- in -- and after "RTO" delete "maximma-" and insert -- maxima- --;
Line 66, after "passes" delete "though" and insert -- through --.

Column 2,
Line 32, after "air" delete "is" and insert -- are --;
Line 41, after "the" (first occurrence) delete "valve" and insert -- valves --.

Column 3,
Line 16, after "waste" delete "wate" and insert -- water --;
Line 31, after "in" delete "an";
Line 38, after "compounds." delete "In case that" and insert -- If --;
Line 40, after "in" (second occurrence) delete "in case of" and insert -- if --;
Line 41, after "water" insert -- is --.

Column 4,
Line 1, after "the" (first occurrence) delete "remnant" and insert -- remaining --;
Line 49, after "coupled" insert -- with --.

Column 5,
Line 1, before "the" delete "In case that" and insert -- If --;
Line 35, after "ceramic" delete "layer" and insert -- layers --;
Line 36, after "above" delete "remnant" and insert -- remaining --.

Column 6,
Line 6, after "only" insert -- a --;
Line 31, after "2400" delete "$m^{3x0.38}$ cal/m° C" and insert -- $m^3 x^0.38$ cal/$m^3$ $^0C$ --;
Line 33, after "gas" delete "is" and insert -- are --;
Line 41, after "incineration" delete "is" and insert -- are --;
Line 59, after "kcal/" delete "$m^{30}$ C.x($950^0$ C" and insert -- $m^3$ $^0C$.x($950^0C$ --.

UNITED STATES PATENT AND TRADEMARK OFFICE
CERTIFICATE OF CORRECTION

PATENT NO. : 6,397,766 B1
DATED : June 4, 2002
INVENTOR(S) : Suk-in Oh

It is certified that error appears in the above-identified patent and that said Letters Patent is hereby corrected as shown below:

Column 7,
Line 15, after "system" delete "is" and insert -- are --;
Line 26, after "only" insert -- a --;
Line 32, after "to" delete the first instance of "those";
Line 39, after "is" (first occurrence) delete "claim" and insert -- claimed --.

Column 8,
Line 1, after "remaining" insert -- in --;
Line 22, after "ceramic" delete "layer" and insert -- layers --;
Line 33, after "to" delete "and" and insert -- an --;
Line 37, after "storing" delete first instance of "a" and insert -- an --.

Signed and Sealed this

Twenty-eighth Day of February, 2006

JON W. DUDAS
*Director of the United States Patent and Trademark Office*